United States Patent [19]

Pearce et al.

[11] Patent Number: 5,503,773

[45] Date of Patent: Apr. 2, 1996

[54] METHOD OF MAKING A COMPOSITE HANDLEBAR

[75] Inventors: Terry V. Pearce, Sandy; Christopher O. Paragas, Kearns; Ted A. Wall, Bountiful, all of Utah

[73] Assignee: Genesis Composites, L.C., Sandy, Utah

[21] Appl. No.: 303,081

[22] Filed: Sep. 8, 1994

[51] Int. Cl.⁶ .............. B29C 45/34; B29C 45/36
[52] U.S. Cl. .............. 264/328.1; 264/328.12; 264/328.18; 425/577; 74/551.1
[58] Field of Search .............. 264/328.7, 328.1, 264/328.8, 328.9, 328.12, 328.18, 108, 257; 425/577; 249/144, 145; 280/281.1; 74/551.1

[56] References Cited

U.S. PATENT DOCUMENTS

| | | | |
|---|---|---|---|
| Re. 32,242 | 9/1986 | Minnebraker | 280/242 WC |
| D. 306,712 | 3/1990 | Friedrich | D12/133 |
| 2,114,733 | 4/1938 | Anderson | 74/551.1 |
| 2,425,574 | 8/1947 | Stewack | 188/20 |
| 2,487,661 | 11/1949 | McCauley | 74/551.6 |
| 2,799,435 | 7/1957 | Abplanalp | 264/328.9 |
| 2,824,597 | 2/1958 | Lerman | 155/30 |
| 2,876,495 | 3/1959 | Spillman | 425/577 |
| 3,356,185 | 12/1967 | Isaacks | 188/31 |
| 3,533,643 | 10/1970 | Yamada | 280/281 |
| 3,618,968 | 11/1971 | Greer | 280/47.11 |
| 3,833,242 | 9/1974 | Thompson | 280/281 |
| 3,897,857 | 8/1975 | Rodaway | 188/2 F |
| 3,901,524 | 8/1975 | Danziger | 280/34 R |
| 3,964,786 | 6/1976 | Mashuda | 297/330 |
| 4,008,903 | 2/1977 | Ramond | 280/279 |
| 4,015,854 | 4/1977 | Ramond | 280/281 R |
| 4,067,589 | 1/1978 | Hon | 280/278 |
| 4,245,522 | 1/1981 | Robinson | 74/480 R |
| 4,280,595 | 7/1981 | Timms | 188/31 |
| 4,372,087 | 3/1982 | Addicks | 280/279 |
| 4,373,665 | 2/1983 | Dietzsch | 237/12.3 A |
| 4,431,076 | 2/1984 | Simpson | 180/65 R |
| 4,489,955 | 12/1984 | Hamilton | 280/242 WC |
| 4,500,102 | 2/1985 | Haury | 280/242 WC |
| 4,501,033 | 2/1985 | Kessel | 5/200 R |
| 4,548,422 | 10/1985 | Michel | 280/281 R |
| 4,550,927 | 11/1985 | Resele | 280/281 R |
| 4,565,383 | 1/1986 | Isaac | 280/276 |
| 4,593,929 | 6/1986 | Williams | 280/650 |
| 4,596,398 | 6/1986 | Grossi | 280/282 |
| 4,598,944 | 7/1986 | Meyer | 297/183 |
| 4,652,005 | 3/1987 | Hartwell | 280/242 |
| 4,733,755 | 3/1988 | Manning | 188/2 F |
| 4,768,797 | 9/1988 | Friedrich | 280/242 |
| 4,828,285 | 5/1989 | Foret | 280/279 |
| 4,865,337 | 9/1989 | Disler | 280/7.1 |
| 4,901,209 | 2/1990 | Nitz | 362/72 |
| 4,923,203 | 5/1990 | Trimble | 280/288.3 |

(List continued on next page.)

FOREIGN PATENT DOCUMENTS

| | | |
|---|---|---|
| 895046 | 1/1945 | France . |
| 448310 | 5/1949 | France . |
| 19193 | of 1895 | United Kingdom . |
| 2138255 | 10/1984 | United Kingdom . |

OTHER PUBLICATIONS

Trek 1994 Bicycle Catalog.
Dual Forces 1993 Catalog.
Diamondback literature.
Diamondback 1993 Mountain Bike.
1994 Raleigh Mountain Bicycle buyer's Guide.

*Primary Examiner*—Jill L. Heitbrink
*Attorney, Agent, or Firm*—Daniel P. McCarthy

[57] ABSTRACT

A method for manufacturing a fiber-reinforce plastic bicycle handlebar by an injection molding process. The resulting handlebar approximates the exterior appearance, configuration and attachment means of traditional prior art handle bars for all terrain bicycles or mountain bikes, while providing a handlebar that is light weight, strong, durable, shock absorbing and cost efficient to manufacture. A manufacturing method for manufacturing the handlebar includes injection of thermoplastic material into a gap located between a core and cavity.

14 Claims, 5 Drawing Sheets

U.S. PATENT DOCUMENTS

| | | | |
|---|---|---|---|
| 4,953,913 | 9/1990 | Graebe | 297/459 |
| 4,973,242 | 11/1990 | Tsukada | 425/577 |
| 4,989,890 | 2/1991 | Lockard | 280/42 |
| 5,011,172 | 4/1991 | Bellanca | 280/281.1 |
| 5,016,895 | 5/1991 | Hollingsworth | 280/280 |
| 5,028,065 | 7/1991 | Danecker | 280/250.1 |
| 5,060,962 | 10/1991 | McWethy | 280/304.1 |
| 5,074,620 | 12/1991 | Jay | 297/337 |
| 5,092,614 | 3/1992 | Malewicz | 280/11.22 |
| 5,120,071 | 6/1992 | Thibault | 280/474 |
| 5,152,543 | 10/1992 | Sims | 280/250.1 |
| 5,176,393 | 1/1993 | Robertson | 280/250.1 |
| 5,203,433 | 4/1993 | Dugas | 188/2 F |
| 5,240,276 | 8/1993 | Coombs | 280/647 |
| 5,242,179 | 9/1993 | Beddome et al. | 280/233 |
| 5,249,847 | 10/1993 | Lee | 301/105.1 |
| 5,253,888 | 10/1993 | Friedrich | 280/250.1 |
| 5,269,196 | 12/1993 | Rafac | 74/551.1 |
| 5,424,021 | 6/1995 | Nakade et al. | 264/328.2 |

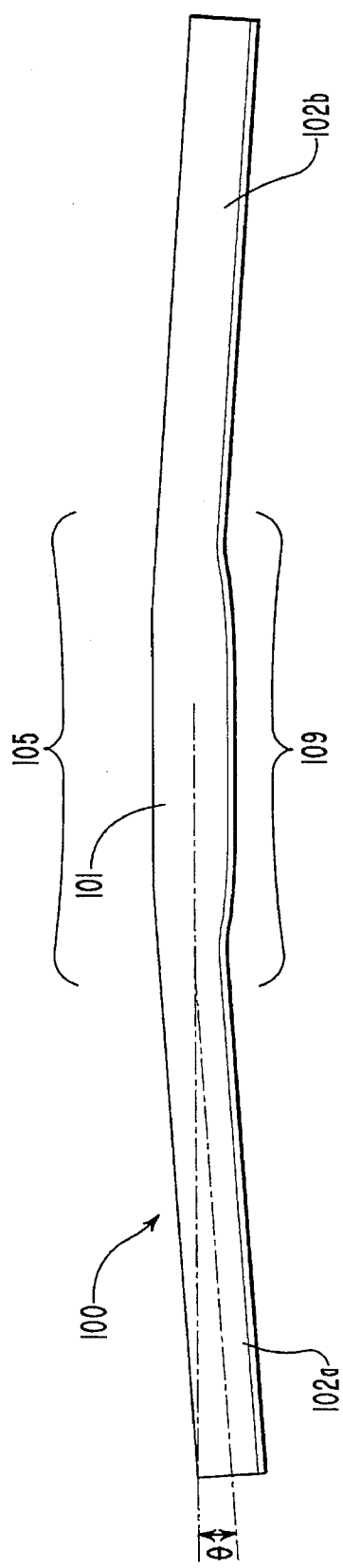
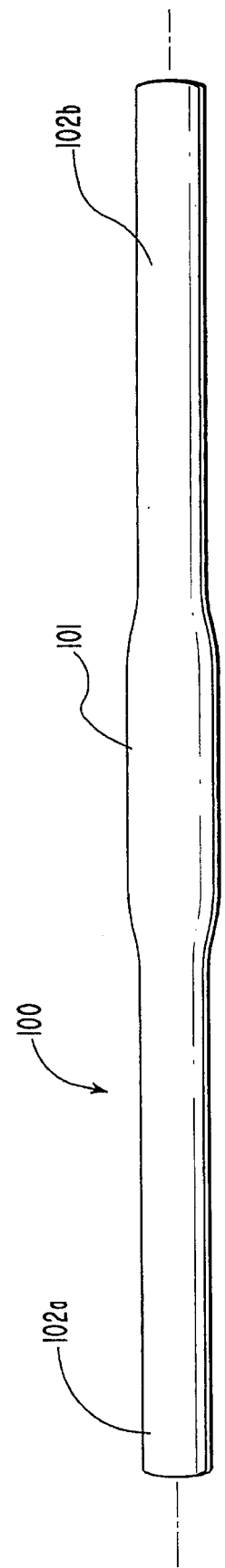
FIG. 2
FIG. 2a

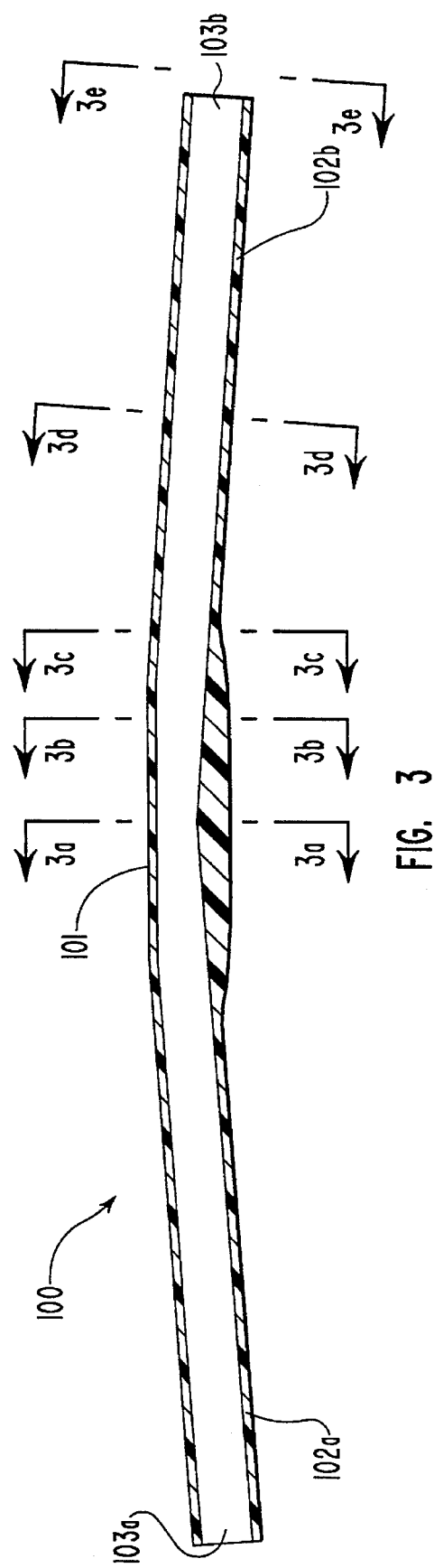
FIG. 3
FIG. 3b
FIG. 3a

METHOD OF MAKING A COMPOSITE HANDLEBAR

BACKGROUND OF THE INVENTION

A. Field of the Invention

This invention relates to the field of bicycle handlebars. More particularly, in the preferred embodiment the invention is a strong, lightweight fiber-reinforced plastic handlebar for all-terrain bicycles (i.e."mountain bikes"). The invention includes a method for making the desired handlebar as a one-piece unit with the aid of an injection molding process.

B. The Background Art

It is desirable in the bicycle arts to replace conventional metal bicycle parts with fiber-reinforced plastic parts. In many applications, fiber-reinforced plastic parts are preferred because they typically offer lighter total weight, inherent shock absorption due to the nature of fiber-reinforced plastic materials, durability, a high-tech appearance and in some cases, lower manufacturing costs.

Due to the preferences of typical bicycle consumers, only fiber-reinforced plastic parts which conform to conventional bicycle appearance, shape, configuration, and attachment means have been commercially successful. There appear to be two reasons for this. First, bicycle consumers are often not comfortable using components that are quite different in appearance than the proven standard bicycle components. Second, bicycle components which are different in shape, configuration, or attachment points may not fit to other standard components or accessories, thus limiting their use or creating additional discomfort to the user because of the possibility of difficulty in future modifications to the bicycle.

Another preference of bicycle consumers that must be taken into consideration is to use the same number of or to use fewer components than are employed on a traditional bicycle. Therefore bicycle consumers find it undesirable to replace a single traditional metal component with two or more fiber-reinforced plastic parts. As a general matter, as total part count is reduced, reliability of the bicycle is increased and total cost is decreased.

The preference of most bicycle consumers for bicycle components of traditional shape and configuration is difficult to satisfy when providing fiber-reinforced plastic components. Typically, a traditional metal bicycle component cannot simply be reproduced as a fiber-reinforced plastic part. Such an identical reproduction typically is not structurally optimized for the material used, and thus typically does not have adequate structural integrity or strength to perform its desired function, resulting in less durability and performance than the metal part sought to be replaced. Further it is generally impossible or at least impractical to identically reproduce a metal part as a fiber-reinforced plastic part because of differences in the available manufacturing methods for metal parts compared with composite parts. Thus, fiber-reinforced plastic components must be designed to provide the desired strength characteristics for their particular application within the available manufacturing method for fiber-reinforced plastics. Such design work is complicated by the need to produce a component which has the same outward shape and configuration as the metal part which it replaces. And the design work is further complicated by the desire of bicycle consumers to utilize fiber-reinforced plastic parts that are equal to or fewer in number than the traditional metal parts that they replace.

In the prior art, the standard shape for metal handlebars for many bicycles, including mountain bikes, is that of a relatively straight tube. These tubes typically have a straight portion in the center, and two end portions which angularly diverge from the longitudinal axis of the center section by about three degrees. The tubes (by the nature of being tubes) have an interior hollow portion.

Prior art fiber-reinforced plastic handlebars typically exhibited a drastically different outward appearance, in shape, configuration, and attachment means than standard metal handlebars. Because of their atypical configuration, such handlebars did not accept standard components or accessories, to the dissatisfaction of their users. Some such handlebars incorporated a greater number of parts than prior art metal handlebars, also to the dislike of typical bicycle consumers.

U.S. Pat. No. 5,269,196 to Rafac, which is hereby incorporated by reference for the material disclosed therein, discloses an injection-molded plastic handlebar which accepts standard brake levers. The Rafac handlebar differs very substantially in shape, appearance, and configuration than typical prior art metal handlebars. The Rafac handlebar also has more parts than a standard one-piece handlebar in that the grip portions must be made separately from the central portion, and the three components later assembled into a handlebar, also contrary to the preference of bicycle consumers. While Rafac made an attempt to provide a handlebar that offers the performance of fiber-reinforced plastic, the configuration and shape that he employed, presumably to achieve what he believed to be a structurally sound handlebar, was found objectional by typical bicycle consumers.

U.S. Pat. No. 4,245,522 to Robinson, which is hereby incorporated by reference, discloses a plastic handlebar which made by assembling multiple pieces. Robinson requires non-standard brake levers and shift levers, and is non-standard in appearance, therefore did not become popular with typical bicycle consumers.

United Kingdom Patent No. 2138755, which is hereby incorporated by reference, discloses a plastic handlebar with grip portions in a non-standard loop shape, and which requires non-standard brake levers, also to the dissatisfaction of typical bicycle consumers.

The Rafac, Robinson and U.K. patent handlebars discussed above are all made by injection molding of thermoplastics with or without discontinuous reinforcing fibers. The injection molding methods used are those typical in the art for molding shapes with a low to moderate length to width ratio (aspect ratio), thus in part accounting for their unusual shapes.

For additional general reference material, the reader is directed to U.S. Pat. Nos. 2,114,733, 2,487,661, 3,039,791, 3,533,643, 3,833,242, 4,008,903, 4,015,854, 4,067,589 4,322,087, 4,548,422, 4,550,927, 4,565,383, 4,596,398, 4,828,285, 4,901,209, 4,923,203, 5,011,172, 5,016,895 each of which is hereby incorporated by reference for the material disclosed therein.

There are also a number of composite handlebars in the commercial prior art which are made by methods including table rolling of resin-impregnated fabrics and tapes, and filament winding. These methods produce handlebars which are too costly to result in widespread use.

Due to the deficiencies of the prior art, there is a need for a handlebar which has the advantages of plastic or fiber-reinforced plastic material, such as light weight, inherent shock absorption characteristics, and low cost manufacture, but that has similar outward appearance, configuration and attachment means as a standard prior art metal handlebars in appearance, shape, configuration, and attachment means. The prior art also lacks a method for making such a fiber-reinforced plastic handlebar from an injection molding process.

II. Summary of the Invention

It is an object of the invention is to provide a process for manufacturing a fiber-reinforced plastic substantially straight tubular bicycle handlebar which has an outward appearance, shape, configuration, and attachment means that are similar to prior art standard metal handlebars. It is a feature of the invention that a manufacturing process is provided that yields such a handlebar that has internal structural characteristics that result in a high strength, durable and therefore useful, high-performance handlebar. It is an advantage of the invention that the resulting handlebar is light weight and has shock absorption characteristics.

It is a further object of this invention to provide a bicycle handlebar that is capable of withstanding the structural loads typically imposed on standard metal handlebars, but which are more shock absorbing and lighter weight than standard metal handlebars. It is a feature of the invention that although the preferred handlebar maintains the outward appearance, configuration and attachment means of prior art metal handlebars, it is not merely a fiber-reinforced plastic replication of such metal handlebars but has internal structural features that result in a high strength yet light weight handlebar.

It is a further object of the invention to provide a fiber-reinforced plastic handlebar which is cost competitive with light alloy metal handlebars. It is a feature of the invention that when the preferred method is employed, high quality fiber-reinforced plastic handlebars can be manufactured at a very rapid rate at very low cost.

It is an object of the invention, in contrast with the prior art, to be able to produce handlebars with very high aspect ratios. The preferred manufacturing method of the invention is able to produce shapes with very high aspect ratios and thus yield a high strength one-piece handlebar rather than a multi-piece handlebar as was known in the prior art.

It is a further object of the invention to provide a bicycle handlebar that is rust and corrosion resistant. The invented fiber-reinforced plastic handlebar is rust and corrosion resistant due to the nature of the materials from which it is made, in contrast to steel and aluminum components of the prior art which are known to rust or otherwise corrode.

Further objects, features and advantages of the invention will become apparent to the reader upon reading the specification and claims and reviewing the drawings.

III. BRIEF DESCRIPTION OF THE DRAWINGS

FIG. 2 shows a top view of the handlebar of FIG. 1.

FIG. 2a depicts a front view of the handlebar of FIG. 2.

Figure 3E:
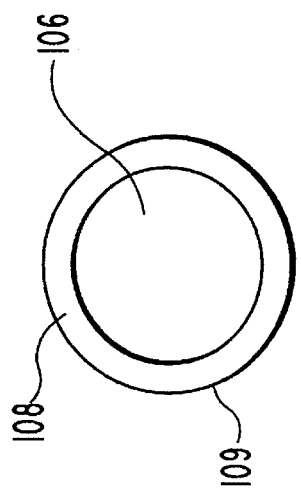
FIG. 3 shows a cross sectional top view of the handlebar of FIG. 2, cut along the longitudinal axis of the handlebar.
Figure 3D:
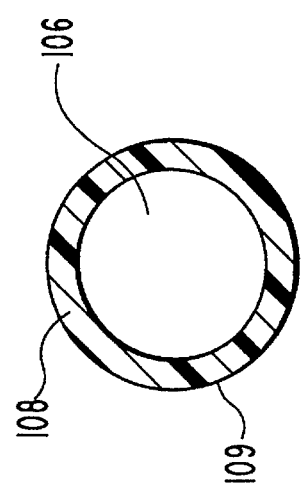
Figure 3C:
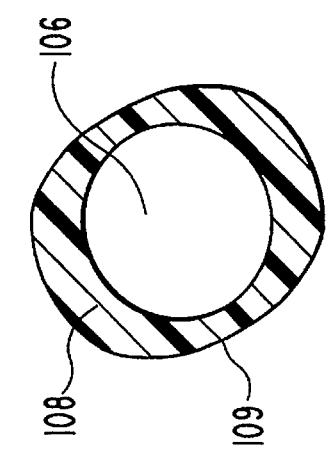

FIGS. 3a, 3b, 3c, 3d, and 3e show cross sections of the handlebar of FIG. 3.

Figure 4:
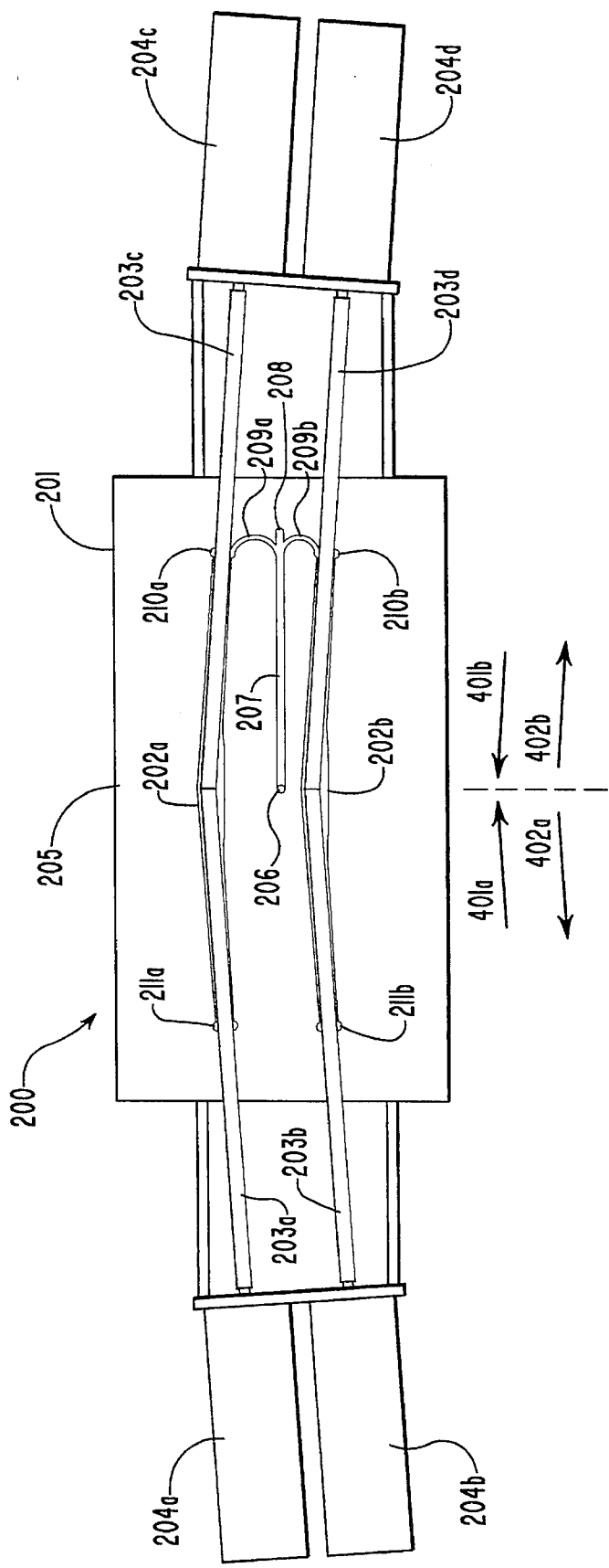

FIG. 4 shows the inner face of an injection mold with pullable cores attached and in place for the molding operation.

IV. DESCRIPTION OF THE PREFERRED EMBODIMENT

A. Configuration of the Invented Handlebar

Figure 1:
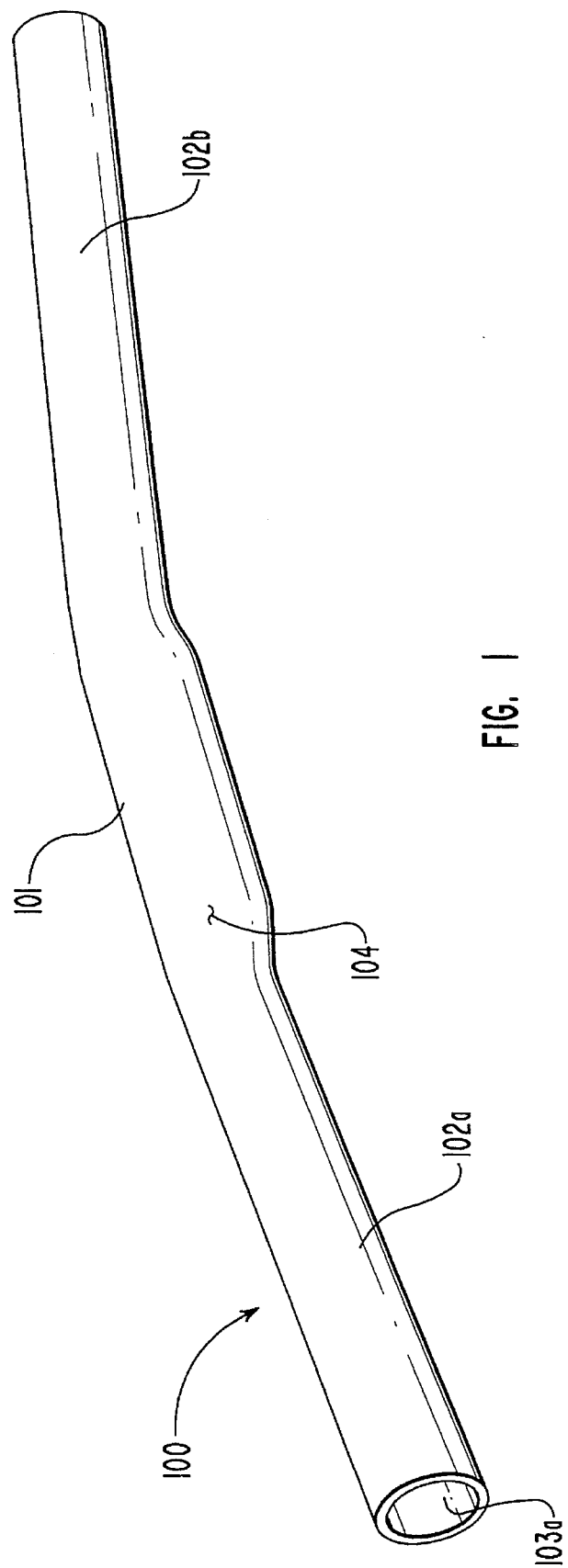
FIG. 1 depicts an isometric view of one preferred embodiment of the mountain bike handlebar of the invention.

FIG. 1 shows a preferred embodiment of the invented fiber-reinforced mountain bike handlebar 100, which is a relatively straight tubular structure. The following description should be read with reference to FIGS. 1, 2, 2a, 3, and 3a–3e. In the preferred embodiment, its diameter is larger in the straight center portion 101 than in the other portions so as to interface with a bicycle handlebar stem attachment in a standard fashion, and the wall 104 is thicker in that same center portion 101 because that is where the bending load is the highest in normal use. The two end portions 102a and 102b are integral with the center portion 101, and the axes of the end portions 102a and 102b are offset at an angle θ from the axis of center section 101, typically plus and minus three degrees respectively. For the purposes of this document, the center portion (101) means a portion of the handlebar intended for mounting on a bicycle handlebar stem attachment, the center portion being substantially straight in the preferred embodiment. For the purposes of this document, the end portions (102a and 102b) shall mean those portions of the handlebar intended for mounting of grips and for grasping by the hands of the bicycle rider, the end portions in the preferred embodiment being oriented at an angle θ from the center portion. It is possible to have end portions which are oriented along the same longitudinal axis as the center portion, to have a curved center portion and curved end portions all oriented along the same curve, or to have another configuration and orientation of center portion and end portions.

FIG. 2 shows a direct top view of the handlebar 100, more clearly showing the anglular orientation of the center portion 101, end portions 102a and 102b, anterior side 105 and posterior side 109. The end portions 102a and 102b are typically of uniform circular exterior cross section, and of lesser outer diameter than center portion 101 so as accept installation of standard grips, brake levers, gear shifts, etc.

FIG. 2a depicts a front view of the handlebar 101. The outer dimensions of the majority of center portion 101 and the outer dimensions of end portions 102a and 102b are identical to the outer dimensions of a typical standard metal handlebar, so that handlebar 100 is equivalent in exterior appearance, shape, configuration, and attachment means to a standard metal handlebar.

FIG. 3 shows the top view of the handlebar 101 from FIG. 2, but in a cross sectional view as though cut down the longitudinal center of the bar. The thickened center section 101 is depicted.

FIGS. 3a, 3b, 3c, 3d and 3e show cross sections of the handlebar with locations as indicated on FIG. 3. FIG. 3a and 3b show that the center portion 101 is circular in exterior shape, so as to have the same attachment means as standard metal handlebars, but the interior surface 106 is not a concentric circle with the exterior surface 107. The material 108 of the handlebar wall 104 along the posterior side 109 of the handlebar 100 is thicker than along the anterior side 105, as depicted, and the material 108 of the handlebar wall 104 is thickest at the center of the center section 101, diminishing in thickness as one moves toward the end portion 102b, as can be seen by comparing FIGS. 3a and 3b. The non-concentricity and non-circularity of the interior surface resulting from the differentiation in wall thickness is provided to enable the mold design and method of this invention, and to promote strength and stiffness in the handlebar 100 where it is needed most, which is on the posterior 109 side of the handlebar (that which faces toward the rider of a bicycle featuring the handlebar).

FIG. 3c shows that the exterior surface of the handlebar 101 at that point and for a short distance on each side is non-circular. This is not a necessary feature of the invention, and in fact goes somewhat contrary to the object of the invention in that standard metal handlebars do not have this short non-circular section. However, the non-circular section of this preferred embodiment is not in an area which attaches to other components, and the non-circularity saves weight in the preferred embodiment. The non-circularity prevails for only a short distance along the handlebar, so it does not materially change the appearance or shape of the overall handlebar.

FIG. 3d and FIG. 3e show that the end portions 102a and 102b have concentric, circular interiors and exteriors. The circular, standard diameter end portions 102a and 102b have exteriors identical to standard metal handlebars and thus attach to standard brake levers, gear shifts, and grips without problem. Ends 103a and 103b are open, just as on standard metal handlebars, which allows standard attachment means for bar ends (attachable devices which protrude from handlebars at an approximate ninety degree angle and serve as an alternate area to grip the handlebars). Thus the configuration of the preferred handlebar meets the object of the invention of providing a fiber-reinforced plastic handlebar for bicycles which has substantially the same shape, configuration, attachment means, and outward appearance (except color) as standard metal handlebars of the straight tube or nearly straight tube variety (such as those used on mountain bikes).

Note that the preferred structure described is a handlebar formed of a continuous wall of fiber-reinforced plastic material, resulting in a one-piece handlebar. The handlebar has an inner cavity formed by the interior surface of the continuous wall. Variations in wall thickness result in some the interior surface of the wall being concentric with the exterior surface of the wall at some locations on the preferred handlebar (such as the end portions where the wall is of substantially the same thickness at all points around the circumference of the wall), and interior surface of the wall not being concentric with the exterior surface of the wall at other locations on the handlebar (such as the center portion).

There are many alternative embodiments of the invention other than the configuration of the preferred handlebar discussed above and illustrated in the Figures. For example, a fully straight handlebar, or a handlebar which has more or less bend than the three degree bends of the preferred handlebar, or a handlebar which has a circular curve rather than an angled bend may be manufactured within the scope of the invention. As another example, the handlebars embodied by this invention do not need to have thicker walls at the center portion 101 than at the end portions 102a and 102b. When the invented method is employed, it is a current practical limitation that all the axes of the variously angled portions of the handlebar must be in one plane. Other types of handlebars, such as the non-planar-curved handlebars associated with road racing bicycles, cannot be manufactured with the methods of this invention in the current embodiment.

B. Preferred Materials for Constructing Handlebars

In the preferred embodiment, the materials used to construct the invented handlebar are thermoplastic composite materials, also called discontinuous-fiber-reinforced thermoplastics or fiber-reinforced plastic. Because the preferred embodiment of the invention utilizes injection molding, materials suitable for injection molding are preferred. The fibers utilized can be of any type that serves a reinforcing function, exemplified by carbon, aramid, glass and others. The thermoplastic resin can be of any injection moldable structural variety, exemplified by polyamide, polyurethane, polyphenaline sulfide, high density polyethylene, polypropylene, polyester terathalate, acrylobutadiene styrene, and polycarbonate. The most preferred fiber in the preferred embodiment is TORAY T-700which is generically known as carbon fiber. For applications where especially low cost is required, E-glass fibers (generically referred to as glass fiber) from Down Corning are preferred. The preferred thermoplastic structural resin is ISOPLAST polyurethane (generically referred to as thermoplastic polyurethane) from Dow Chemical Company. An alternate preferred resin is NYLON 6/6 (generically referred to as polyamide thermoplastic) from Dupont. In an alternative to the preferred embodiments, the invention comprises handlebars made of injection moldable structural thermoplastics without reinforcing fibers. This is not preferred, because the stiffness of the plastic handlebars will generally be less without reinforcing fibers, but the invented handlebar could be manufactured from such materials. As used herein, the terms "fiber-reinforced plastic" and "composite" shall mean any of the abovelisted materials or any combination of the above-listed materials, and shall also mean thermoplastics reinforced with non-fibrous materials.

All of the above named fiber-resin composites are inherently shock absorbing, especially in comparison with metals. Such materials were chosen in the invention because they permit the manufacture of handlebars that are more shock absorbing and lighter weight than standard metal handlebars. All of the above named fiber-resin combinations are sufficiently comparable to or superior to the steels, aluminums, and titaniums typically used in metal handlebars in strength-to-weight ratio and stiffness-to-weight ratio. They have been chosen because they permit the manufacture of a handlebar that is capable of withstanding the structural loads typically imposed on standard metal handlebars and which must be withstood by any handlebar to be useful.

C. Method for Making Handlebars

In the preferred embodiment, the invented handlebar is manufactured by an injection molding process. Injection molding is a known prior art process wherein molten plastic, unfilled or filled with fibers and the like, is injected at high pressure into a cavity mold, then cooled until the plastic solidifies. At that point, the mold is opened and a molded part is ejected from the mold by ejector pins. The mold is then closed and the cycle begins again. Injection molding is very quick, usually less than one minute per cycle, and the labor required is low cost, typically consisting of one wage grade attendant per molding machine. Thus, when injection molding is used to manufacture the invented handlebar, the resulting fiber-reinforced plastic handlebar is cost competitive with prior art metal alloy handlebars. Further, the preferred materials described above are available at low cost, resulting in a low cost product.

The preferred manufacturing method of this invention is best described with reference to FIG. 4. In FIG. 4, preferred tooling assembly 200 used in the invented method is depicted. The tooling 200 includes a standard injection molding base 201. Only one mold face 205 of the injection molding base 201 is shown for simplicity and clarity, although two mold faces come together to form the cavity in which the invented handlebar is molded in the preferred embodiment. The opposing mold face that is used is a mirror image of that which is depicted.

The mold face 205 contains cavities 202a and 202b which are identical to each other and are of the same dimensions as the exterior of the preferred handlebar. Having two cavities enables the molding of two handlebars in each molding shot, thus increasing output rate and decreasing cost per handlebar. The interior surface of the handlebars is formed by cores 203a, 203b, 203c, and 203d. These cores are each attached respectively to hydraulic cylinders 204a, 204b, 204c, and 204d. Hydraulic cylinders 204a–204d act to insert the cores 203a–203d into the cavities 202a and 202b before the molding shot begins, then retract the cores 203a–203d from the cavity and out of the molded handlebars before the mold is opened and the handlebars are ejected.

Before the molding shot begins, cores 203a and 203b are inserted into cavities 202a and 202b respectively by cylinders 204a and 204b respectively in the direction indicated by arrow 401a. Likewise, before the molding shot begins, cores 203c and 203d are inserted into cavities 202a and 202b respectively by cylinders 204c and 204d respectively in the direction indicated by arrow 401b. When the molding shot is finished, cores 203a and 203b are withdrawn from cavities 202a and 202b respectively by cylinders 204a and 204b respectively in the direction indicated by arrow 402a. Likewise, when the molding shot is finished, cores 203c and 203d are withdrawn from cavities 202a and 202b respectively by cylinders 204c and 204d respectively in the direction indicated by arrow 402b.

Cores 203a and 203c join in the middle, as do likewise cores 203b and 203d, prior to the molding shot. A pin (not shown) protruding from mold face 205 joins with a slot (not shown) at the end of each of cores 203 to secure the cores 203 so that they will not move during the injection of the molten plastic.

When the mold shot begins, plastic (such as fiber-reinforced plastic) is injected into the mold base 200 through a hole in sprue 206, then travels down runner 207. Upon reaching cold well 208, the stream splits and moves down runners 209a and 209b. The plastic then travels around the circumferences of ring gates 210a and 210b and knits together at 180 degrees from the points where runners 209 join ring gates 210. Note that the preferred ring gates 210a and 210b form cavities around the full circumference of their end of the mold cavity, although in alternative embodiments of the invention it may be possible to utilize other ring gates. Knit lines such as this can be poor in structural properties, and thus it is important to have the knitting occur in a portion that is not part of the final product. It can be seen in the Figure that the knitting would occur beyond the far end of an end portion of the handlebars.

After knitting, the plastic flows without further knit lines into cavity 202 and all the way to the end of cavity 202 and into cold wells 211a and 211b, which are full rings around the circumference of cores 203a and 203b. The cold wells 211a and 211b may be of any desired shape. It is strongly preferred that the cold wells fully surround the circumference of the cores 203a and 203b, although other cold wells are possible. Pressure is then increased to several thousand pounds per square inch to pack the part and to eliminate any air voids. When the plastic cools (by heat transfer to the metal of the mold) sufficiently to resolidify, the hydraulic cylinders 204 pull the cores 203 out of the two handlebars, and the mold is opened by the injection molding press to which mold base 200 is attached. As the mold opens, ejector pins push the part out of the mold. Excess material exists which filled ring gate 210 and cold well 211 during molding. This excess material is cut off by sawing methods well known in the art, and a finished handlebar results which has the same general shape, configuration, attachment means, and appearance (except color) as standard metal handlebars of the same variety, thus accomplishing another object of the invention.

The sawing off of the material which filled ring gate 210 eliminates the material which contained a knit line, thus ensuring that the material in the actual handlebar contains no knit lines. The flowing of the material from one end of the handlebar to the other ensures that there are no weak areas which result from turbulent flow of the fibers, as would result if there was an injection point within cavity 202 itself, and no weak areas which would result from knit lines, as would result if the material was injected from each end of cavity 202 to meet in the center. The sawing off of the material which filled cold well 210 eliminates the leading edge of flowing plastic, which can often pick up impurities from the mold and is often weak from having cooled too much before the pressure packing occurred, thus ensuring that the material in the actual handlebar contains no impurities or unpacked materials.

Key features of the method of this invention which enable an injection molded handlebar to have the same general shape, appearance, configuration, and attachment means as standard metal handlebars include: 1) the use of removable cores to form the internal surface of a handlebar which enter from each end and join reasonably in the center of the cavity; 2) the use of a ring gate outside the filling end of a handlebar cavity which will fill with knit-lined material to be later removed as excess material and which will allow the material to enter the cavity around the full circumference of the cavity, thus ensuring that the material will not knit within the cavity; 3) the flowing of material from one end of a handlebar to the other to reduce the likelihood of discontinuities in fiber alignment or plastic flow; 4) the use of a cold well into which the leading edge of plastic flows from a handlebar cavity, thus eliminating the portion of flowing plastic which has potentially poor quality by later removal.

It should be emphasized that it is preferred that the moldable material from which the molded product is to be made enter the mold cavity at one end and travel substantially uninterrupted to the other end of the mold cavity to provide a strong, quality molded product. It should be noted that in the preferred embodiment the moldable passes through a ring gate before entering the mold cavity, the ring gate serving to distribute the moldable material fully around the circumference of the core before the moldable material enters the mold cavity so that when the moldable material fills the gap between the core and the mold cavity walls, it does so without any knit lines which are sources of potential weakness. Any area, such as a ring gate, which causes moldable material to be distributed about a core before the moldable material enters the main mold cavity is referred to herein as a pre-stage cavity.

The cold well at the far end of the mold cavity serves to capture moldable material which may have been excessively cooled as it passed through the mold cavity (called the "leading edge"), thus preventing that material from becoming part of the product. Any area, such as the cold well, that receives the leading edge of moldable material at the far end of a mold is referred to herein as a post-stage cavity. It should be noted that all of the various cavities and passages through which moldable material flows or in which moldable material rests are in fluid communication with each other to facilitate receipt and transfer of moldable material.

In the preferred embodiment, the two cores physically meet within the mold cavity, although such meeting is not necessary. They may simply be in the proximity of each other. Alternatively, solid handlebars could be molded if cores were omitted, but they would be excessively heavy and would use excessively large amounts of moldable material.

In the preferred embodiment, the invention also includes a mold as depicted and described, including features such as opposing mold faces, a sprue formed in the opposing mold faces, a runner having a first end and a second end, the runner first end being in fluid communication with the sprue, a runner cold well located at the runner second end, the runner cold well being in fluid communication with the runner and the sprue, a handlebar-shaped cavity formed between the opposing mold faces, the cavity having a first end and a second end, a ring gate at the first end of the cavity, the ring gate being in fluid communication with said cavity first end and the ring gate being in fluid communication with the runner cold well, a cold well at the second end of the cavity, the cold well being in fluid communication with the cavity second end, a first core insertable into and retractable from the cavity first end, and a second core insertable into and retractable from the cavity second end such that the first core and the second core may be placed within close proximity to each other or meet within the cavity. Variations of the mold are possible.

It is to be noted that product resulting from the preferred invented manufacturing process and the preferred handlebar itself have numerous advantages over the prior art. With regard to the preferred method, it is a very important that the invented method provides a one-piece continuous fiber-reinforced plastic handlebar, not a multi-piece assembled handlebar of prior art composite technology. Further, the preferred method produces a handlebar which is has an outward appearance, shape, configuration and attachment means similar to prior art metal handlebars and thus preferred by bicycle consumers. In addition, the preferred handlebar is: 1) lighter weight than traditional steel handlebars and traditional aluminum alloy handlebars, and weight competitive with highly optimized titanium and aluminum handlebars; 2) less costly to manufacture than highly optimized titanium and aluminum handlebars or composite handlebars made by filament winding or table rolling, competitive with cost of manufacture of standard aluminum handlebars, and only slightly more expensive cost than non-optimized mild steel handlebars; 3) more shock absorbing than metal handlebars; and 4) can be made with higher production rates than fiber-reinforced handlebars made with manufacturing methods other than injection molding. All of these features are accomplished without sacrifice of needed strength and stiffness.

The preferred handlebars of this invention will have the following advantages over handlebars of the prior art which are made by injection molding but do not have traditional shape, configuration, attachment means, and appearance: 1) less customer dissatisfaction with appearance and with adaptability to other components (the handlebar of the invention looks and operates like traditional handlebars); 2) ability to attach traditional componentry by traditional means; and 3) reduced part count (the handlebar of the invention is one-piece).

While the present invention has been described and illustrated in conjunction with a number of specific embodiments, those skilled in the art will appreciate that variations and modifications may be made without departing from the principles of the invention as herein illustrated, described, and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

We claim:

1. In an injection molding environment including:
   (1) opposing mold faces,
   (2) a handlebar-shaped cavity formed by the mold faces, the cavity having a first end and a second end,
   (3) a core insertable into and retractable from the cavity such that a gap exists between the core the cavity wall, the gap being suitable for the molding of moldable material therein, and
   (4) means for injecting moldable material into the cavity; a method for manufacturing a handlebar, the method comprising:
     (a) inserting the core into the cavity such that a gap exists between core and cavity wall,
     (b) injecting moldable material into the cavity first end so that the moldable material passes along the length of the cavity to fill the gap to the cavity second end,
     (c) pressurizing the moldable material,
     (d) permitting the moldable material to cool,
     (e) removing the core from the cavity, and
     (f) removing the handlebar formed by the moldable material.

2. A method for manufacturing a continuous, one-piece, fiber-reinforced plastic bicycle handlebar comprising:
   (a) obtaining an injection molding assembly including:
     (1) opposing mold faces,
     (2) a handlebar-shaped cavity formed by the mold faces, the cavity having a first end and a second end,
     (3) a core insertable into and retractable from the cavity such that a gap exists between the core the cavity wall, the gap being suitable for the molding of moldable material therein, and
     (4) means for injecting moldable material into the core,
   (b) inserting the core into the cavity such that a gap exists between core and cavity wall,
   (c) injecting moldable material into the cavity first end so that the moldable material passes along the length of the cavity to fill the gap and to the cavity second end,
   (d) pressurizing the moldable material,
   (e) permitting the moldable material to cool,
   (f) removing the core, and
   (g) removing the handlebar formed by the moldable material.

3. A method for manufacturing a continuous, one-piece, fiber-reinforced plastic bicycle handlebar comprising:
   (a) obtaining an injection molding assembly including:
     (1) a mold having a mold face,
     (2) a handlebar-shaped cavity in the mold face, the cavity having a first end and a second end,
     (3) a first core insertable into and retractable from the cavity first end, and
     (4) a second core insertable into and retractable from the cavity second end such that the first core and the second core may be placed within close proximity to each other within the cavity,
   (b) inserting the first core into the cavity first end,
   (c) inserting the second core into the cavity second end,
   (d) injecting moldable material into the cavity first end so that the moldable material fills the entire cavity from cavity first end to cavity second end, (e) pressurizing the moldable material, (f) permitting the moldable material to cool, (g) removing both cores, and (h) removing the handlebar formed by the moldable material.

4. In an injection molding environment including:

(1) opposing mold faces, (2) a handlebar-shaped cavity formed by the mold faces, the cavity having a first end and a second end, (3) a ring gate at the first end of the cavity, (4) a cold well at the second end of the cavity, (5) a core insertable into and retractable from the cavity such that a gap exists between the core the cavity wall, the gap being suitable for the molding of moldable material therein, and (6) means for injecting moldable material into the core; a method for manufacturing a handlebar, the method comprising:

(a) inserting the core into the cavity such that a gap exists between core and cavity wall, (b) injecting moldable material into the cavity so that the moldable material passes first through the ring gate, second along the length of the cavity to fill the gap, and passes third to the cold well, (c) pressurizing the moldable material, (d) permitting the moldable material to cool, (e) removing the core from the cavity, and (f) removing the handlebar formed by the moldable material.

5. A method for manufacturing a continuous, one-piece, fiber-reinforced plastic bicycle handlebar comprising:

(a) obtaining an injection molding assembly including:

(1) opposing mold faces, (2) a handlebar-shaped cavity formed by the mold faces, the cavity having a first end and a second end, (3) a ring gate at the first end of the cavity, (4) a cold well at the second end of the cavity, (5) a core insertable into and retractable from the cavity such that a gap exists between the core the cavity wall, the gap being suitable for the molding of moldable material therein, and (6) means for injecting moldable material into the core, (b) inserting the core into the cavity such that a gap exists between core and cavity wall, (c) injecting moldable material into the cavity so that the moldable material passes first through the ring gate, second along the length of the cavity to fill the gap, and passes third to the cold well, (d) pressurizing the moldable material, (e) permitting the moldable material to cool, (f) removing the core, and (g) removing the handlebar formed by the moldable material.

6. A method for manufacturing a continuous, one-piece, fiber-reinforced plastic bicycle handlebar comprising:

(a) obtaining an injection molding assembly including:

(1) a mold having a mold face, (2) a handlebar-shaped cavity in the mold face, the cavity having a first end and a second end, (3) a ring gate at the first end of the cavity, (4) a cold well at the second end of the cavity, (5) a first core insertable into and retractable from the cavity first end, and (6) a second core insertable into and retractable from the cavity second end such that the first core and the second core may be placed within close proximity to each other within the cavity, (b) inserting the first core into the cavity first end, (c) inserting the second core into the cavity second end, (d) injecting moldable material into the cavity so that the moldable material passes first through the ring gate, second along the length of the cavity, and third to the cold well, (e) pressurizing the moldable material, (f) permitting the moldable material to cool, (g) removing both cores, and (h) removing the handlebar formed by the moldable material.

7. A method as recited in claim 3 wherein first core and second core meet within the cavity.

8. A method as recited in claim 6 wherein the moldable material first substantially fills the ring gate before moldable material enters the cavity.

9. A method as recited in claim 8 wherein in the ring gate moldable material flows around the entire circumference of the first core substantially before moldable material enters the cavity.

10. A method as recited in claim 6 wherein moldable material enters the cavity at only the cavity first end and only from the ring gate.

11. A method as recited in claim 3 wherein moldable material enters the cavity at only one end of the cavity and flows substantially uninterrupted to the other end of the cavity.

12. A method as recited in claim 10 wherein moldable material flows from the ring gate through the cavity to the cold well substantially without interruption.

13. A method as recited in claim 6 wherein the cold well serves to receive the leading edge of the moldable material being molded, such material comprising the leading edge being retained in the cold well and not forming any portion of the handlebar being molded.

14. A method for manufacturing a handlebar comprising:

(a) obtaining an injection molding assembly including:

(1) opposing mold faces, (2) a handlebar-shaped main cavity in the mold faces, (3) core insertable into and retractable from the main cavity, (4) a port into which moldable material may be injected, (5) a pre-stage cavity between the port and the main cavity, and (6) a post-stage cavity, the port, pre-stage cavity, main cavity and post-stage cavity forming a pathway through which moldable material flows in that order when injected through the port, (b) inserting the core into the cavity, (c) injecting moldable material into the mold at a single location, that location being the port, the injection being so that the moldable material passes first through the pre-stage cavity where it encompasses the outer circumference of the core, second through the cavity, and third through the post-stage cavity so that material comprising a leading edge of the moldable material is captured by the post-stage cavity, such movement of moldable material being substantially without interruption, (d) pressurizing the moldable material, (f) permitting the moldable material to cool, (g) removing the core, and (h) removing the handlebar formed by the moldable material from the cavity.

* * * * *